US007506267B2

(12) United States Patent
Baxter et al.

(10) Patent No.: US 7,506,267 B2
(45) Date of Patent: *Mar. 17, 2009

(54) COMPOSE RATE REDUCTION FOR DISPLAYS

(75) Inventors: Brent S. Baxter, Hillsboro, OR (US); Philip J. Corriveau, Hillsboro, OR (US); Thomas E. Walsh, Banks, OR (US)

(73) Assignee: Intel Corporation, Santa Clara, CA (US)

(*) Notice: Subject to any disclaimer, the term of this patent is extended or adjusted under 35 U.S.C. 154(b) by 690 days.

This patent is subject to a terminal disclaimer.

(21) Appl. No.: 10/746,112

(22) Filed: Dec. 23, 2003

(65) Prior Publication Data

US 2005/0138569 A1    Jun. 23, 2005

(51) Int. Cl.
G06F 3/048   (2006.01)
G06F 3/00    (2006.01)

(52) U.S. Cl. .................. 715/781; 345/606; 345/619; 715/767; 715/768; 715/726

(58) Field of Classification Search .......... 715/781, 715/767, 768, 726; 375/240.16; 345/606, 345/619
See application file for complete search history.

(56) References Cited

U.S. PATENT DOCUMENTS

| | | | | | |
|---|---|---|---|---|---|
| 5,343,241 | A | * | 8/1994 | Richards et al. | 348/97 |
| 5,500,685 | A | * | 3/1996 | Kokaram | 348/620 |
| 5,557,684 | A | * | 9/1996 | Wang et al. | 382/107 |
| 5,809,219 | A | * | 9/1998 | Pearce et al. | 345/426 |
| 5,995,668 | A | * | 11/1999 | Corset et al. | 382/233 |
| 6,008,865 | A | * | 12/1999 | Fogel | 348/700 |
| 6,057,847 | A | * | 5/2000 | Jenkins | 345/422 |
| 6,075,905 | A | * | 6/2000 | Herman et al. | 382/284 |
| 6,211,882 | B1 | * | 4/2001 | Pearce et al. | 345/419 |
| 6,243,498 | B1 | * | 6/2001 | Chen et al. | 382/260 |
| 6,330,371 | B1 | * | 12/2001 | Chen et al. | 382/260 |
| 6,396,520 | B1 | | 5/2002 | Ording | |
| 6,417,853 | B1 | * | 7/2002 | Squires et al. | 345/473 |
| 6,442,203 | B1 | * | 8/2002 | Demos | 375/240.16 |
| 6,459,455 | B1 | * | 10/2002 | Jiang et al. | 348/452 |

(Continued)

FOREIGN PATENT DOCUMENTS

GB        2373946        10/2002

OTHER PUBLICATIONS

PCT International Search Report, dated Mar. 18, 2005, International Application No. PCT/US2004/042677, International Filing Date Dec. 17, 2004 (13 pgs.).

(Continued)

Primary Examiner—Steven B Theriault
(74) Attorney, Agent, or Firm—Kacvinsky LLC

(57) ABSTRACT

Embodiments of the present invention blend frames over a specified temporal window to produce a smooth appearance at a reduced frame rate. As the window moves further or closer to the viewer, motion blur may be accomplished by temporal averaging. In particular, the temporal average is used to blend image information for a predefined/brief interval before and after the time of the output frame, retaining all of the image information, but in a slightly blurred form. After the relevant image information is retained, frames may be displayed at a reduced output rate while retaining sufficient information to reproduce a smoothly moving animation sequence.

12 Claims, 4 Drawing Sheets

U.S. PATENT DOCUMENTS

| | | | | |
|---|---|---|---|---|
| 6,600,491 | B1 * | 7/2003 | Szeliski et al. | 345/473 |
| 6,625,333 | B1 * | 9/2003 | Wang et al. | 382/300 |
| 6,631,240 | B1 * | 10/2003 | Salesin et al. | 386/68 |
| 6,654,020 | B2 * | 11/2003 | Mori | 345/475 |
| 6,782,143 | B1 * | 8/2004 | Dube et al. | 382/300 |
| 6,816,552 | B2 * | 11/2004 | Demos | 375/240.15 |
| 6,910,060 | B2 * | 6/2005 | Langan et al. | 708/819 |
| 7,084,875 | B2 * | 8/2006 | Plante | 345/473 |
| 7,170,938 | B1 * | 1/2007 | Cote et al. | 375/240.03 |
| 2002/0094026 | A1 * | 7/2002 | Edelson | 375/240.01 |
| 2002/0135587 | A1 * | 9/2002 | Cunniff | 345/545 |
| 2004/0005084 | A1 * | 1/2004 | Kondo et al. | 382/107 |
| 2004/0061786 | A1 * | 4/2004 | Fletcher et al. | 348/208.6 |
| 2004/0252230 | A1 * | 12/2004 | Winder | 348/402.1 |
| 2004/0252759 | A1 * | 12/2004 | Winder et al. | 375/240.12 |
| 2005/0057687 | A1 * | 3/2005 | Irani et al. | 348/443 |
| 2005/0134591 | A1 * | 6/2005 | Baxter | 345/473 |
| 2006/0023788 | A1 * | 2/2006 | Otsuka et al. | 375/240.16 |
| 2006/0187359 | A1 * | 8/2006 | Soupliotis et al. | 348/700 |

OTHER PUBLICATIONS

Tim Wittenburg, "Motion Blur Effects", Dr. Dobb's Journal Miller Freedman USA, vol. 22, No. 7, Jul. 1997, pp. 36, 38, 84 (XP008043948 ISSN: 1044-789X.

Hugo Elias, "Motion Blur" [Online] Oct. 25, 1999, pp. 1-10 (XP002320018) Retrieved from the Internet: URL:http://freespace.virgin.net/hugo.elias/updates.htm>; [retrieved on Mar. 2, 2005].

A. Watt; M. Watt, "The Theory and Practice of Anti-Aliasing Techniques", (pp. 111-152, 262-265), 1992, Addison-Wesley, Wokinham, England Sections 4.3.1-4.3.3, 4.10 (XP-002320019)—entitled Advanced Animation and Rendering Techniques in PCT Search Report dated Mar. 18, 2005.

Frank Dachille IX, et al., "High-Degree Temporal Antialiasing", Computer Animation 2000, Proceedings May 3-5, 2000, Piscataway, New Jersey, USA, IEEE, May 3, 2000, pp. 49-54 (XP010526529) ISBN: 0-7695-0683-6, Sections 1-4.

Mikio Shinya, "Spatio-Temporal Anti-Aliasing by the Pixel-Tracing Method", Systems & Computers in Japan, Scripta Technica Journals, New York, USA, vol. 26, No. 14, Nov. 15, 1995, pp. 54-66 (XP000551715) ISSN: 0882-1666, Sections 1, 2.1, 2.2, 4.

Elias, H. "Motion Blur", http://freespace.virgin.net/hugo.elias/updates.htm, Oct. 25, 1999, 9 Pages.

Dachille IX, F. et al., "High-Degree temporal Antialiasing", Computer Animation 2000, IEEE Proceedings, (May 3, 2000), pp. 49-54.

Targa averager v1.1, 2 Seiten, updated Sep. 12, 1998, http://warp.povusers.org/PovUtils/average/; eHB. 2 Pages.

Hening, P. A., Taschenbuch Multimedia (Multimedia Pocket Book), 2nd Edition, (2001), pp. 178-186.

* cited by examiner

COMPOSE RATE REDUCTION FOR DISPLAYS

RELATED APPLICATION

This application is related to U.S. application Ser. No. 10/747,922, filed Dec. 23, 2003, entitled "Spatio-Temporal Generation of Motion Blur," and assigned to Intel Corporation.

BACKGROUND

A personal computer (PC) display typically shows a stack of application windows corresponding to different types of work a user may be doing (for example, word processing, e-mail, spreadsheet, video, etc.), with the currently active application window at the top of the stack, thus appearing closest to the user. When a user changes from one activity to another, these windows are re-composed into a new desktop image, bringing a new application window to the fore.

Future PC product plans call for composing the application windows using three-dimensional (3D) animation techniques to provide the user with a richer visual experience where the animations move smoothly. To make the animations move smoothly, they must be free from jerkiness that can be caused if the desktop image is not composed rapidly enough. Unfortunately, composing a PC desktop image at sufficiently high rates requires excessive amounts of graphics memory bandwidth, which increases costs to levels that may be unsustainable in products targeting the mobile and low cost PC markets.

Conventionally, to deal with inadequate computational or memory resources, frames are simply dropped. Since image information representing original content is discarded, the result often is animation that is jerky in appearance, similar to animated video often seen on personal computers today. This frame skipping may cause the video frame-rate to drop below the frame rate desired to perceive smooth motion. As a result, low bit rate video may at times look jerky to the user.

DETAILED DESCRIPTION

Figure 1:
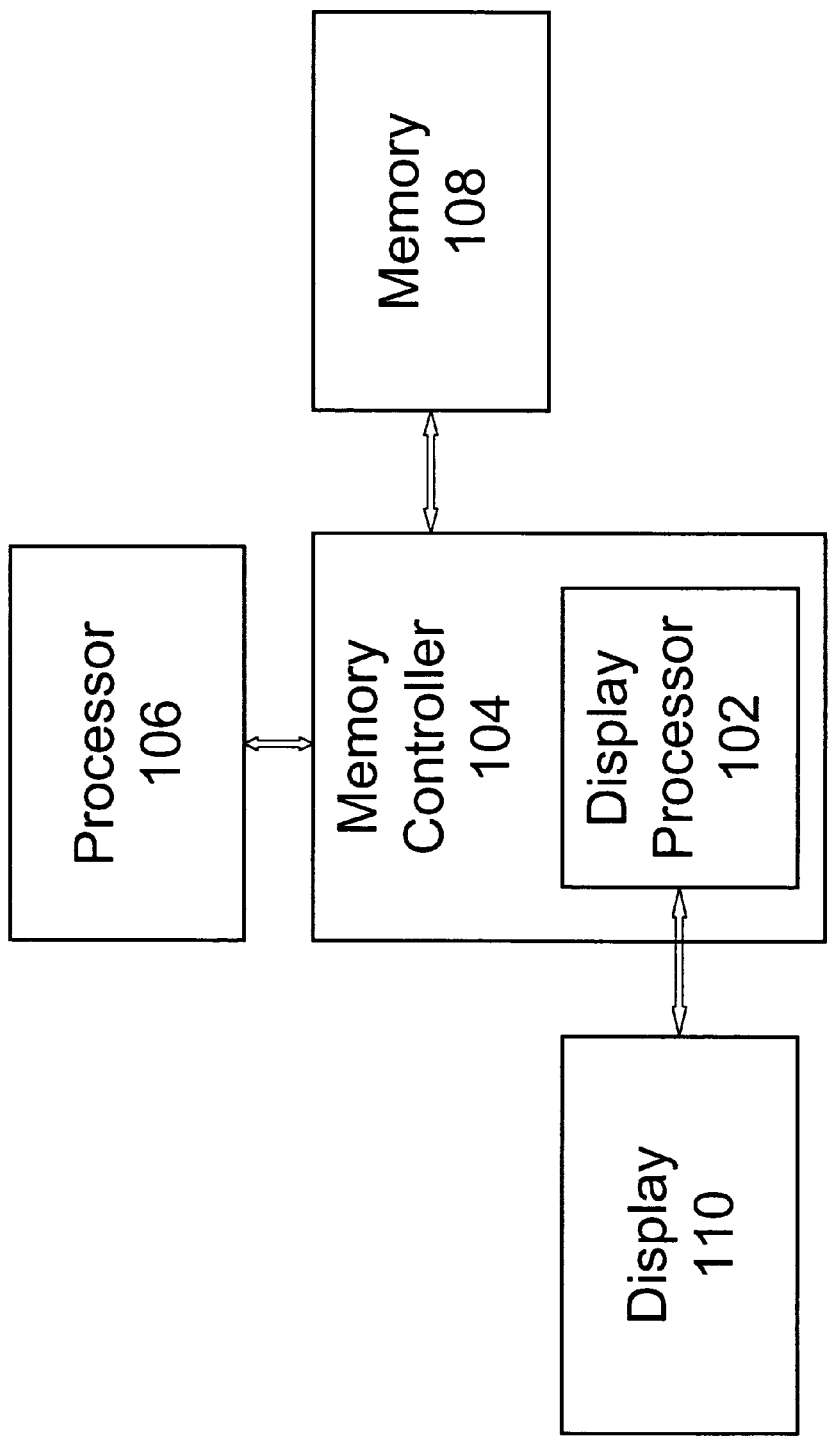
FIG. 1 illustrates a block diagram of an embodiment of a computer system that includes a graphics display system.

Embodiments of the present invention blend display frames over a specified temporal interval to produce a smooth appearance when presented to the user at a reduced frame rate. This processing is similar to the motion blurring that occurs for moving objects during a time lapse photograph. As an application window moves further away from, or closer to, the viewer, motion blur may be accomplished by temporal averaging. In particular, temporal average is used to blend image information for a predefined/brief interval before and after the time of the output frame, retaining all of the image information, but in a slightly blurred form. After the relevant image information is retained, the output rate may be reduced while retaining sufficient information to produce the appearance of a smoothly moving animation sequence. The weighted average imposes a lower frequency limit on the sequence prior to sampling (e.g. dropping frames) so that a later high quality reconstruction is possible. Motion blur preserves image quality during 3D animations giving them a pleasing appearance at low composition rates, which eliminates the need for unreasonably high graphics memory bandwidth, thus reducing PC product costs.

In the detailed description, numerous specific details are set forth in order to provide a thorough understanding of the present invention. However, it will be understood by those skilled in the art that the present invention may be practiced without these specific details. In other instances, well-known methods, procedures, components and algorithms have been described in detail so as not to obscure the present invention.

Some portions of the detailed description that follow are presented in terms of algorithms and symbolic representations of operations on data bits or binary signals within a computer. These algorithmic descriptions and representations are the means used by those skilled in the data processing arts to convey the substance of their work to others skilled in the art. An algorithm is here, and generally, considered to be a self-consistent sequence of steps leading to a desired result. The steps include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities. Unless specifically stated otherwise as apparent from the following discussions, it is appreciated that throughout the specification, discussions utilizing such terms as "processing" or "computing" or "calculating" or "determining" or the like, refer to the action and processes of a computer or computing system, or similar electronic computing device, that manipulate and transform data represented as physical (electronic) quantities within the computing system's registers and/or memories into other data similarly represented as physical quantities within the computing system's memories, registers or other such information storage, transmission or display devices.

Embodiments of the present invention may be implemented in hardware or software (microcode), or a combination of both. However, embodiments of the invention may be implemented as computer programs executing on programmable systems comprising at least one processor, a data storage system (including volatile and non-volatile memory and/or storage elements), at least one input device, and at least one output device. Program code may be applied to input data to perform the functions described herein and to generate output information. The output information may be applied to one or more output devices, in known fashion. For purposes of this application, a processing system includes any system that has a processor, such as, for example, a digital signal processor (DSP), a micro-controller, an application specific integrated circuit (ASIC), or a microprocessor.

The above description of illustrated embodiments of the invention is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

FIG. 1 illustrates a diagram of an embodiment 100 of a computer system that includes a 3-D display processor 102 for generating motion blur using temporal averaging. Elements of the computer system that are not necessary for an understanding of the present invention are not shown, for convenience. Although display processor 102 is depicted as part of a memory controller 104, display processor 102 may also be configured as a stand-alone device. Display processor 102 may also be configured as a single chip device or as part of a system-on-a-chip, a multi-chip module or a plug-in circuit board. Display processor 102 may be comprised in any of various systems, including a computer system, network PC, Internet appliance, a television, including HDTV systems and interactive television systems, personal digital assistants (PDAs), wearable computers, and other devices which display 2D and or 3D graphics, among others.

As shown, the computer system includes a processor 106 in communication with a memory controller 104 including display processor 102. Display processor 102 is also in communication with memory 108. Processor 106 may comprise one or more processors of varying types, e.g., microprocessors, multi-processors and CPUs. Memory 108 may comprise any combination of different types of memory subsystems, including random access memories, (e.g., DDR, SDRAM, RDRAM, among others) and mass storage devices. A display device 110 may be coupled to display processor 102. The display device 110 may be any of various types of display monitor or device including but not limited to a video monitor, a cathode ray tube (CRT), liquid crystal display (LCD), reflective liquid-crystal-on-silicon (LCOS), or gas-plasma display. Application software may be executed by system to display graphical and video objects on display device 110.

Various input devices (not shown) may be connected to the computer system, including a keyboard and/or cursor control device. The cursor control device permits a user to select various command modes, modify graphic data, and input other data. More particularly, input device permits a user to selectively position a cursor at any desired location (such as a windows icon) on display by movement of the cursor control device over a surface. It will be appreciated that a variety of well known input devices may be utilized by the present invention, including other control devices such as mechanical mice, track balls, etc.

Figure 2:
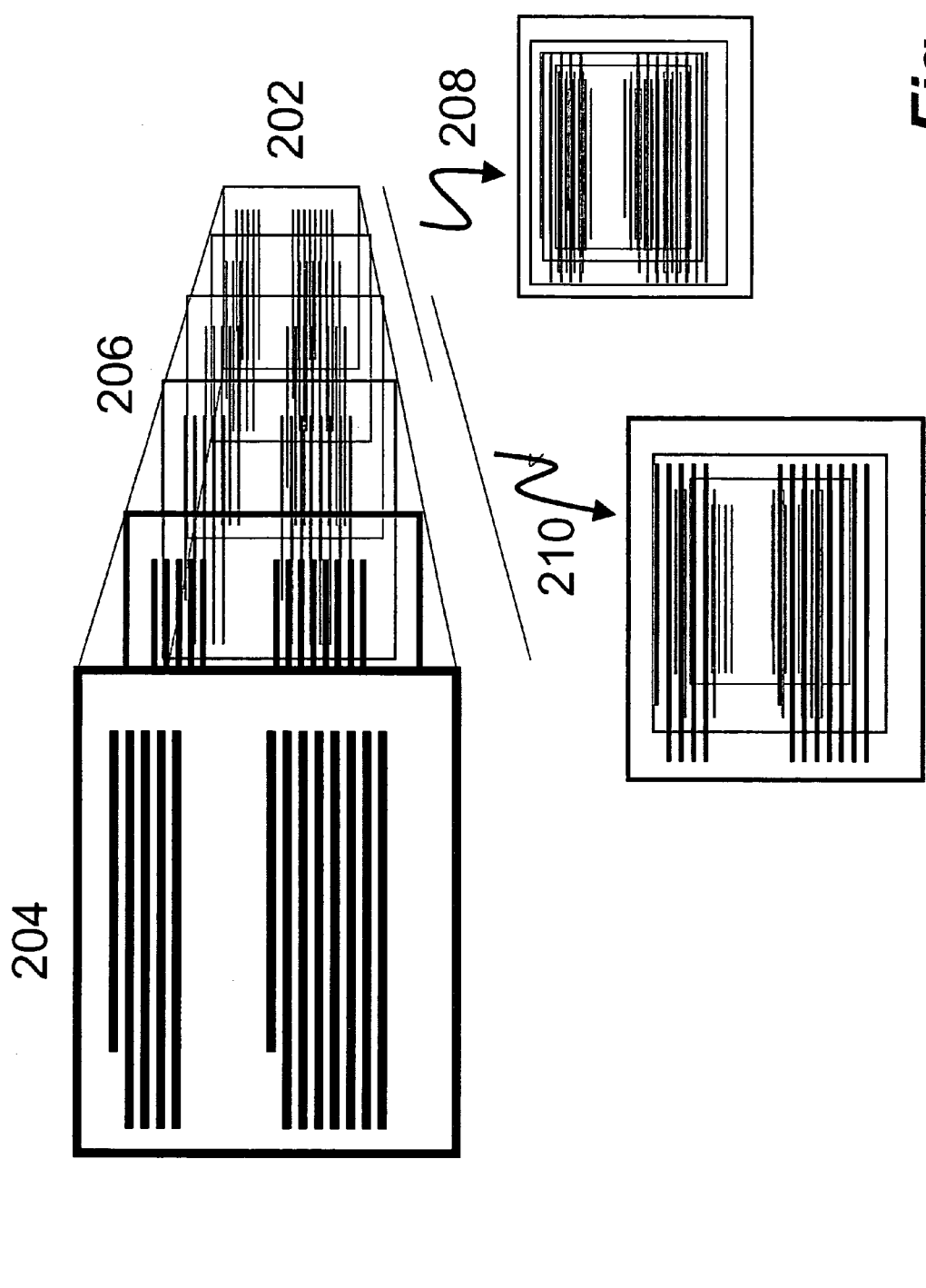
FIG. 2 illustrates a window in which word processing application is being executed.

FIG. 2 illustrates a diagram of an embodiment 200 of a screen shot of a display environment. This screen shot illustrates one example of how an implementation of the invention creates blurred motion as the perceived distance between an initial window 202 and a final window 204 is traversed as part of an animated transition 206. A "window" may be a traditional rectangular region on a display in which text or data is displayed, as well as smaller sub-regions, such as pop-up, pull-down or other menus, icons, symbols or other display elements, and objects, generally. In this environment, the user interface provided by an operating system, such as Windows, Linux, OS/2, or Macintosh OS, as well as one or more windows associated with currently running application programs. In a common implementation, an Internet browser application can run in one window and a word processor application can run in a second window on the desktop of the operating system.

In another embodiment of a window display system, a user clicks on an icon and activates a window 204 causing it to become situated on top of other windows for the purpose of operating on data within the window 204. During the activation sequence, an intermediate series of windows 206 of increasing size is produced to represent the animated motion of the window into its final position 204. In objects such as rectangular windows, menus or sub-menus, the data displayed in such objects may include alpha numeric and/or graphic data. Accordingly, it will be appreciated that the apparatus and method of the present invention has application to any object displayed on the display, regardless of the shape, size or function of the object in any particular computer display system.

Referring now to the transition phase, several intermediate subsequences of this window are averaged together (for example, 206) and presented to the display. Since all of the original information is preserved in the averages, the reduced frame-rate associated with averages 208, 210 preserve the illusion of smooth motion from the initial image 202 and the final image 204. By blurring the individual frames of the object on the display, this method may transform the object in a smoother fashion as opposed to a sharp, jerky manner. As shown, the text of the window is clearly visible with full detail and being suitable for being operated upon by the user once it appears in its full sized state 204. In contrast, the text of the window appears blurry to the user when it is transitioning to its full state 204. The text becomes more defined as it grows from an icon to a full sized state. By including a sufficient number of intermediate frames in each average, the appearance can appear to grow in a smooth fashion, despite the reduced frame rate associated with the displayed frames.

A small icon includes a representation of the contents of a window in thumbnail fashion. For example, an icon includes a headline that as it grows in size, appears as if it is arising out of a mist and gradually like a cartoon. When a window icon is clicked and opened, it can appear in a number of ways. In one implementation, the window opens up to display full sized content, retaining its horizontal orientation throughout the animated sequence. In another implementation the window rotates as it grows to full size over time somewhat in the manner of the spinning newspaper headlines seen in early newsreel films.

In accordance with embodiments of the invention, frames are smoothly blended over a specified time window to produce a smooth appearance at a reduced frame rate. Motion blur is utilized to preserve image quality during these 3D animations giving them a pleasing appearance at low composition rates, which eliminates the need for unreasonably high graphics memory bandwidth, thus reducing PC product cost. The motion of the window is conveyed in a more convincing manner with motion blur applied. The motion of the window is particularly apparent when compared with the sharp or in-focus nature of the remainder of the screen.

Figure 3:
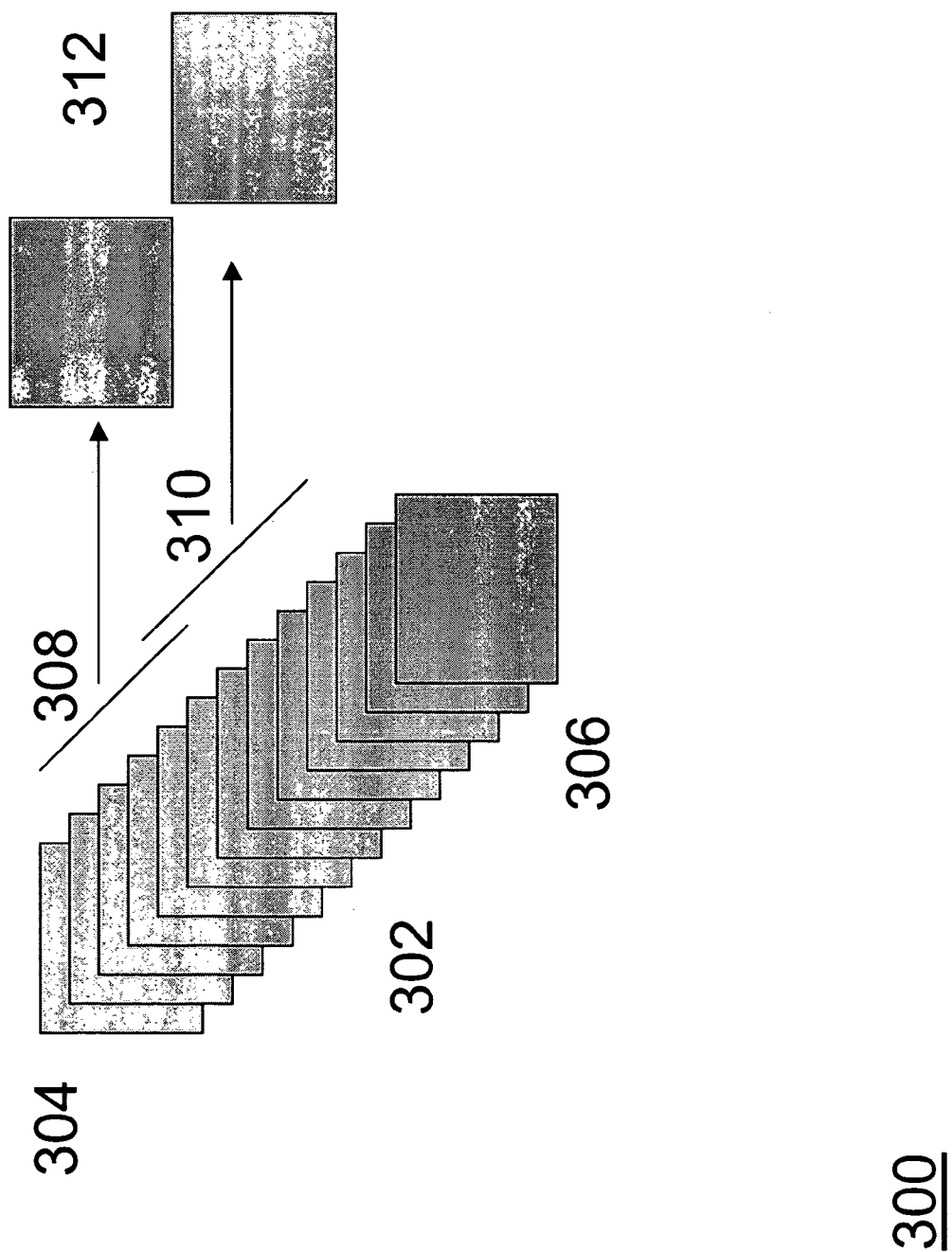
FIG. 3 is a diagram of an embodiment of temporal averaging for compose rate reduction.

FIG. 3 is a diagram of an embodiment 300 of a sequence of frames showing the temporal relationships more specifically. The sequence of frames 302 includes a first frame 304 and an nth frame 306. Frames 302 can be in any of a number of common formats. Each frame in the sequence 302 represents the content rendered at a particular point in time. Individual members of the sequence 302 are rendered in rapid succession. An individual frame within the sequence 302 may be generated by sampling an application model at an instant of time.

The sampling model simulates a shutter on a video camera by averaging together subsequences 310 and 312 of individual frames 308 to produce the sub-sampled frames 314. Motion blur simulates a time-duration exposure produced real-world video shutters. Generally, the display of object movement during the averaging interval is the simulation of real-world motion blur that would occur over that interval when taking a photograph. A subsequent averaging interval 310 and 312 likewise simulates real-world motion blur over the subsequent averaging interval. As will be described in greater detail below, this process relies upon the calculation of a weighted average of selected frames.

In particular, the weighted average is computed for each subset of frames 310, 312 resulting in a reduced number of frames 314 which are then displayed. The reduced number of displayed frames 314 provides the sought after saving in memory bandwidth.

As noted above, as the window moves further or closer to the viewer, motion blur may be accomplished by temporal averaging. In particular, the temporal average is used to blend image information for a predefined/brief interval before and after the time of the output frame, retaining all of the image information, in a slightly blurred form. This weighting gives less prominence to the first and last frames in each averaging interval and more prominence to the frame(s) near the center of the averaging interval. Adjusting the weights in this manner allows one sub-sampled image to flow smoothly into the next, preserving the illusion of smooth motion in the reduced rate display sequence.

The weighted average imposes an upper frequency limit on the sequence prior to sampling (e.g. dropping frames) so that a later high quality reconstruction is possible.

Figure 4:
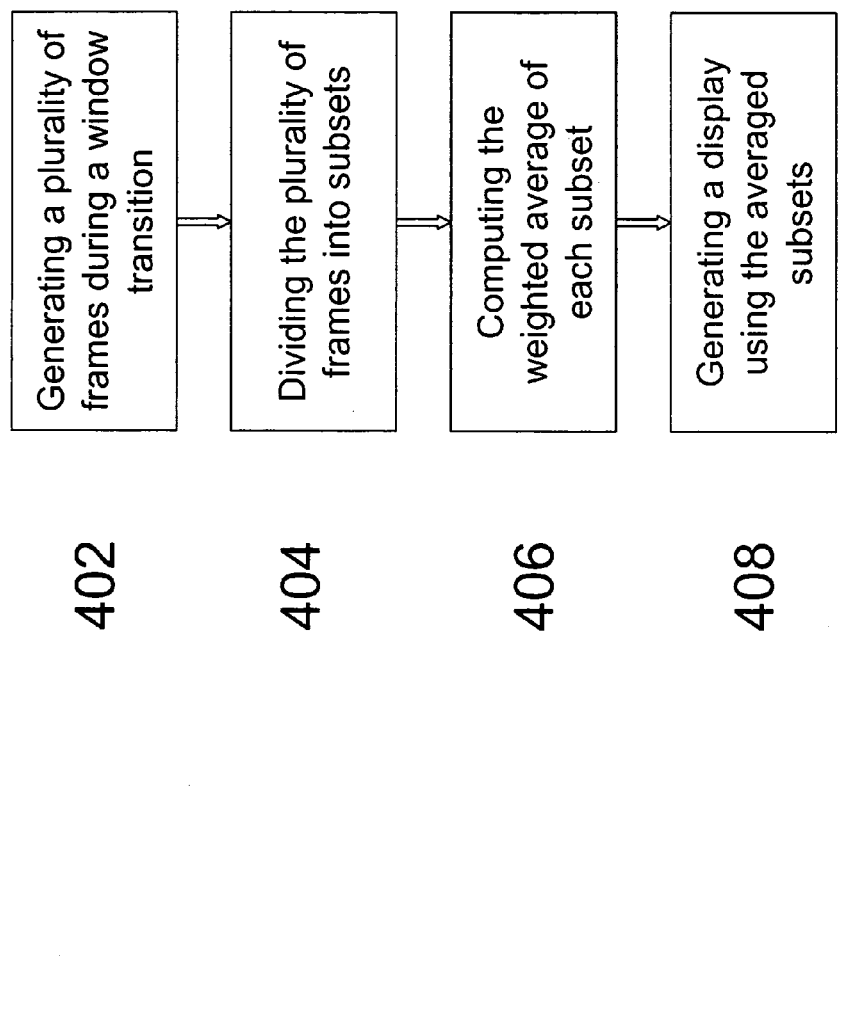
FIG. 4 is a flow chart of one embodiment for compose rate reduction.

FIG. 4 is a flow chart of one embodiment 400 for compose rate reduction. Motion blurring of frames is performed by calculating weighted average along temporally adjacent sequences of the frames.

In step 402, a series of frames is created by well-known techniques. The series of frames can include any number of frames. In one embodiment, the series of frames includes n frames, representing x frames per second of an application window as it is opened for viewing. Animation sequences are typically from 0.25 to 0.5 seconds in total duration.

In step 404, the series of frames are divided into subsets of frames. In one embodiment, the series of n frames is divided into a series of n/x sets of frames, each set consisting of y frames.

In step 406, the weighted average is computed for each subset of frames. In particular, the temporal average is used to blend image information for a predefined/brief interval before and after the time of the output frame, thus retaining all of the image information, in a slightly blurred form so that a later high quality reconstruction is possible.

In operation, a weighted average is computed for a selected number of adjacent high-speed frames. A weighted average is then computed for a later succession of high speed frames and so forth. Frame rate reduction is achieved while maintaining the information contained in the entire high-speed sequence. The result is a smooth image display.

Many bases for selecting the subset can be used. These bases include any of the bases described above, any variation of the bases described above, and any combination of the bases described above and/or variations thereof. Within the scope of the present invention, the subset size is not limited, and can vary from set to set.

In a typical implementation, a small icon has content of a window in thumbnail fashion. The window can include content such as a headline. As the window including headline grows in size, it appears to arise in a mist-like, smooth, blurred fashion. The window starts out as a small instance and subsequent intermediate instances are generated. Each instance appears larger, perhaps at a different position or orientation than the than the one before it and the temporal average is calculated at selected points to generate frames. There transitions are typically short, comprising perhaps only 5-6 weighted averages but are sufficient to create the appearance continuous movement throughout.

In step 408, the weighted averaged frames are displayed. As noted above, the frames representing the original content are blurred before the low rate frames are displayed. When the low rate frames back are displayed, the window animation that the operating system wants will look natural and smooth.

Final image comprises the combination of sub-frames. For example, the path from icon to full sized window is blurred. One skilled in the art will recognize that the frames can be used or processed in any of a variety of ways, for example, in a forward sequential fashion typical of video viewing, or in a reverse or scrambled fashion.

The above description of illustrated embodiments of the invention is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method of generating a motion blur, comprising:
generating a series of frames during an activation sequence, said series of frames representing an application window within a graphical user interface;
dividing the series of frames into subsets of frames;
computing a weighted average for each subset of frames; by using a temporal average to blend image information for a predefined/brief interval before and after the time of an output frame; and
displaying the weighted averaged frames.

2. The method claimed in claim 1, wherein generating a series of frames of a window further comprises:
representing x frames per second of an application window as it is opened for viewing.

3. The method claimed in claim 1, wherein dividing the series of frames into subsets of frames further comprises:
dividing the series of n frames into a series of n/x sets of frames, each set consisting of y frames.

4. The method claimed in claim 1, wherein computing a weighted average for each subset of frames further comprises:
computing a weighted average for a selected number of adjacent high-speed frames.

5. A computer readable medium having stored therein a plurality of machine readable instructions executable by a processor to provide for motion blurring, comprising:
instructions to generate a series of frames during an activation sequence, said series of frames representing an application window within a graphical user interface;
instructions to divide the series of frames into subsets of frames;
instructions to compute a weighted average for each subset of frames by using a temporal average to blend image information for a predefined/brief interval before and after the time of an output frame; and
instructions to display the weighted averaged frames.

6. The computer readable medium claimed in claim 5, wherein instructions to generate a series of frames of a window further comprises:
instructions to represent x frames per second of an application window as it is opened for viewing.

7. The computer readable medium claimed in claim 5, wherein instructions to divide the series of frames into subsets of frames further comprises:

instructions to divide the series of n frames into a series of n/x sets of frames, each set consisting of y frames.

8. The computer readable medium claimed in claim 5, wherein instructions to compute a weighted average for each subset of frames further comprises:

instructions to compute a weighted average for a selected number of adjacent high-speed frames.

9. A system comprising:

a display processor to generate a series of frames during an activation sequence, said series of frames representing an application window within a graphical user interface, divide the series of frames into subsets of frames, compute a weighted average for each subset of frames by using a temporal average to blend image information for a predefined/brief interval before and after the time of an output frame, and displaying the weighted averaged frames.

10. The system claimed in claim 9, further comprising:

a memory controller in communication with the display processor.

11. The system claimed in claim 9, wherein the display processor is configured as a stand-alone device.

12. The system claimed in claim 9, further comprising:

a memory for storing the series of frames of the window.

\* \* \* \* \*

UNITED STATES PATENT AND TRADEMARK OFFICE
CERTIFICATE OF CORRECTION

PATENT NO. : 7,506,267 B2  Page 1 of 1
APPLICATION NO. : 10/746112
DATED : March 17, 2009
INVENTOR(S) : Baxter et al.

It is certified that error appears in the above-identified patent and that said Letters Patent is hereby corrected as shown below:

In column 1, line 7, delete "10/747,922," and insert -- 10/747,322, --, therefor.

Signed and Sealed this

Sixteenth Day of March, 2010

David J. Kappos
*Director of the United States Patent and Trademark Office*